Dec. 22, 1959     H. S. ZABLOCKI     2,918,518
BATTERY COMPONENT
Filed Nov. 30, 1956
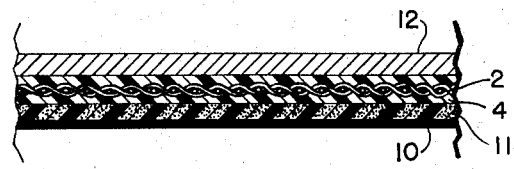
*INVENTOR.*
HENRY S. ZABLOCKI
BY Leonard H. King
AGENT

United States Patent Office 2,918,518
Patented Dec. 22, 1959

2,918,518
BATTERY COMPONENT
Henry S. Zablocki, Nutley, N.J.

Application November 30, 1956, Serial No. 625,450

2 Claims. (Cl. 136—145)

This invention relates to die-cuttable sheeting for electrochemical cells which combines the functions of electrolyte and depolarizer.

In the copending application of Arnold S. Louis, Serial Number 625,364, now U.S. Patent 2,843,649 entitled, "Miniature Moldable Battery," filed concurrently herewith and assigned to the assignee of the present invention, there is disclosed an electrochemical cell having the entire system encapsulated in a plastic container. To facilitate the encapsulation and molding of the particular cells, disclosed in the referenced patent application, and for the manufacture of batteries in general, it would be useful to have electrolyte in sheet form which could be easily fabricated by machine methods, such as die punching, which will withstand the rigors of a molding operation and which will be sufficiently dry so as not to express electrolyte during molding. A sheeting meeting these requirements is disclosed in the copending application of Sidney A. Corren entitled, "Sheet Electrolyte For Batteries," now U.S. Patent 2,853,537, filed concurrently herewith and assigned to the assignee of this application. This invention is an improvement over the said Corren invention.

Accordingly, it is an object of this invention to provide an electrolyte sheeting for electrochemical cells.

It is another object to provide a combined sheet electrolyte-depolarizer for electrochemical cells.

It is still another object to provide a sheet electrolyte incorporating depolarizer which may be die cut.

Still a different object is to provide a more effective depolarizer.

A further object is to provide a sheet electrolyte depolarizer which may be readily sealed into a molded electrochemical cell.

Still other objects and advantages will be pointed out with particularity and still others will become apparent as the following description, taken in conjunction with the accompanying drawing, proceeds.

In the drawing, there is shown in cross-section a battery sheeting of this invention.

Referring to the drawing, there is shown a woven fiberglass mat 2, impregnated with insolubilized polyvinyl alcohol 4 which has absorbed therein an electrolyte. Applied to one side of the impregnated mat is a polyvinyl alcohol-carbon-depolarizer suspension 11 which provides depolarization as well as good electrical contact to the carbon electrode 10. Zinc electrode 12 completes the cell. The cell may be packaged in any number of the suitable containers known to the art including the battery cell disclosed in the referenced patent application of Arnold S. Louis and the cell disclosed in H. A. Gottschall Patent No. 2,684,397.

For a more complete understanding of the invention there is provided the following detailed example:

Example 1

Electrolyte sheeting was made using the following materials.

I. Glass fiber cloth of 0.003" thickness Hess-Goldsmith & Co., No. 112.

II. Polyvinyl alcohol, (E. I. du Pont de Nemours & Co.,

|  | Parts |
|---|---|
| "Elvanol 72–60") | 100 |
| Dimethylol urea | 10 |
| Ammonium chloride | 1 |
| Water | 1500 |

III. Polyvinyl alcohol (E. I. DuPont de Nemours & Co.:

|  | Parts |
|---|---|
| "Elvanol 70–05") | 10 |
| Graphite (Dixon Grade 200–10) | 100 |
| Water | 500 |

IV. Electrolyte:

|  | Parts |
|---|---|
| Water | 40 |
| Glycerine | 40 |
| Ammonium chloride | 1 |

Two sheets of glass cloth (I) approximately 2' x 3' were washed in concentrated nitric acid and then thoroughly rinsed. The two sheets were then stretched over a heated platen. The polyvinyl alcohol solution (II) was then evenly applied to the glass cloth lay-up. Upon the completion of each coat, the lay-up was heated to approximately 150° F. and each successive layer dried.

Three coats, on the glass cloth, accomplished thorough impregnation with the polyvinyl alcohol solution. Following the impregnation, each side of the lay-up was given a brush coat of the polyvinyl alcohol solution to bring the thickness of the coated glass cloth to 0.009"±0.001".

A .001 inch coating of a depolarizer-polyvinyl alcohol composition was applied to one side of the above described sheeting employing the following composition:

|  | Parts |
|---|---|
| V. Depolarizer-manganese dioxide | 90 |
| Carbon black | 10 |
| Polyvinyl alcohol | 10 |
| Water | 80 |

The finished sheet was then heated at 250° F. for one hour. The sheet was then cut into pieces of suitable size for use in the electrochemical cell.

Prior to use in the cell, the coated glass fiber sheet was soaked for 24 hours in the electrolyte (IV). The electrolyte sheet was then towel dried to remove excess electrolyte just prior to use and in this form was readily die cut to the desired shape.

The electrolyte sheet was then incorporated in a battery as described in the above referenced copending application of Arnold S. Louis. The output voltage for a two cell battery was 2.4 volts, and the short circuit current 1000 micro-amperes.

Example 2

A final coating 0.001 inch thick of a depolarizer-polyvinyl alcohol composition VI, was applied to the side of the sheeting of Example 1 in lieu of composition V.

|  | Parts |
|---|---|
| VI. Manganese dioxide | 72 |
| Carbon black | 8 |
| Polyvinyl alcohol | 20 |
| Water | 160 |

Under short circuit test, a 100 micro-ampere current was obtained. A two cell battery developed 2.4 volts.

Example 3

Example 1 was repeated using the following composition as the coating material in lieu of composition V.

|  | Parts |
|---|---|
| VII. Manganese dioxide | 80 |
| Polyvinyl alcohol | 20 |
| Water | 160 |

Under test a two cell battery developed 2.4 volts and a short circuit current of 30 micro-amperes.

Example 4

Example 1 was repeated using the following composition as the coating material in lieu of composition I.

|  | Parts |
|---|---|
| VIII. Carbon black | 80 |
| Polyvinyl alcohol | 20 |
| Water | 160 |

Under test, a two cell battery developed 2.0 volts and only 4 micro-amperes short circuit current.

The poor results of Examples 3 and 4 when contrasted with the results of Example 2 provide a clear teaching that the combination of the two depolarizers disclosed provides a far superior battery than either material employed alone.

The preferred ranges of materials for the depolarizer layer are as follows:

|  | Parts by weight |
|---|---|
| Polyvinyl alcohol | 5 to 25 |
| Depolarizer mix | 75 to 95 |

The preferred composition for the depolarizer mix is as follows:

|  | Parts by weight |
|---|---|
| Manganese dioxide | 75 to 95 |
| Carbon black | 5 to 25 |
| Total | 100 |

It should be noted that while I have disclosed for purposes of illustration, but one electrolyte for use with a zinc-carbon electrode system, other electrolytes not reactive with the polyvinyl alcohol may be employed in keeping with the particular electrochemical system involved. It is to be understood that other electrochemical systems employing inert cathodes may be used. Thus for example cadmium, magnesium and other metals similarly located in the electrochemical series may be used in conjunction with suitable electrolytes.

Likewise for other electrochemical systems other depolarizers may be more suitable than the manganese dioxide-carbon black disclosed, such as for example, lead peroxide, vanadium pentoxide and mercuric oxide.

While the preferred porous support member is glass fiber cloth, it is within the scope of this invention to employ rayon, nylon, Dacron, orlon, saran, or other woven cloths, filter paper or the like. The particular porous support member chosen should be consistent with the chemical properties of the electrolyte; that is to say the electrolyte and mat material should not be chemically reactive.

Thus, while in accordance with the statutes I have disclosed the best mode presently contemplated for carrying out the invention it is to be understood that various modifications may be made without departing from the spirit of the invention.

What is claimed is:

1. A monolithic die cuttable electrolyte-depolarizer sheet structure, containing immobilized electrolyte, adapted for insertion between the positive and negative electrodes of an electrochemical cell to provide a cell reaction and ion diffusion medium between said electrodes in the absence of mobile electrolyte comprising: a polyvinyl alcohol sheet; a woven fiber reinforcing member encapsulated in said polyvinyl alcohol sheet; and a layer of polyvinyl alcohol contiguous with one face of said polyvinyl alcohol sheet, said layer of polyvinyl alcohol having distributed therein a quantity of a depolarizer, suitable for said electrochemical cell, sufficient to depolarize said electrochemical cell; and a liquid electrolyte impregnated in the said polyvinyl alcohol sheet and said polyvinyl alcohol layer, wherein said fiber is selected from the group consisting of glass and polymeric synthetic resin fibers mutually non-soluble and non-reactive with said depolarizer, said electrolyte, and said polyvinyl alcohol.

2. The monolithic electrolyte depolarizer sheet structure of claim 1 wherein said depolarizer is composed of from 75% to 95% of manganese dioxide and from 5% to 25% by weight of carbon black.

References Cited in the file of this patent

UNITED STATES PATENTS

| 2,487,985 | Ruben | Nov. 15, 1949 |
|---|---|---|
| 2,536,696 | Ruben | Jan. 2, 1951 |
| 2,593,893 | King | Apr. 22, 1952 |
| 2,635,127 | Yardney et al. | Apr. 14, 1953 |
| 2,666,802 | Woodring et al. | Jan. 19, 1954 |
| 2,771,381 | Morehouse | Nov. 20, 1956 |

FOREIGN PATENTS

| 365,359 | Germany | June 21, 1887 |